United States Patent
Pattan et al.

(10) Patent No.: US 11,825,548 B2
(45) Date of Patent: Nov. 21, 2023

(54) METHOD, MSG IN 5G SERVER, AND NON-MSG IN 5G GATEWAY FOR PROVIDING MESSAGING SERVICE IN 5G SYSTEM

(71) Applicant: Samsung Electronics Co., Ltd., Suwon-si (KR)

(72) Inventors: Basavaraj Jayawant Pattan, Bangalore (IN); Sapan Pramodkumar Shah, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/459,735

(22) Filed: Aug. 27, 2021

(65) Prior Publication Data
US 2022/0070651 A1 Mar. 3, 2022

(30) Foreign Application Priority Data

Aug. 28, 2020 (IN) .............................. 202041037179
Aug. 13, 2021 (IN) .............................. 202041037179

(51) Int. Cl.
*H04W 8/04* (2009.01)
*H04W 4/12* (2009.01)
(Continued)

(52) U.S. Cl.
CPC ............... *H04W 8/04* (2013.01); *H04W 4/12* (2013.01); *H04W 60/00* (2013.01); *H04W 84/042* (2013.01); *H04W 88/16* (2013.01)

(58) Field of Classification Search
CPC ......... H04W 8/04; H04W 60/00; H04W 4/12; H04W 84/042; H04W 88/16; H04W 8/18
See application file for complete search history.

(56) References Cited

U.S. PATENT DOCUMENTS 10,952,046 B2 * 3/2021 Lee ..................... H04W 60/005
11,337,043 B2 * 5/2022 Berger .................. H04W 12/72
(Continued)

FOREIGN PATENT DOCUMENTS

EP 2683183 A1 1/2014
WO 2019/104336 A1 5/2019

OTHER PUBLICATIONS

3GPP; TSG SA; Message Service within the 5G System; Stage 1 (Release 16), 3GPP TS 22.262 V16.0.0, Dec. 2018 (Year: 2018).*
(Continued)

*Primary Examiner* — Khawar Iqbal (57) ABSTRACT

The present disclosure relates to a pre-5th generation (5G) or 5G communication system to be provided for supporting higher data rates beyond 4th generation (4G) communication system such as long term evolution (LTE). Embodiments herein provide a method, an MSGin5G server, and non-MSGin5G gateway for providing messaging service in $5^{th}$ generation system. The provided method provides a TRF which can assist the MSGin5G server to determine a transport service(s), a GWSF which can assist the MSGin5G server to determine appropriate gateway for the determined transport service(s). Further, the provided method includes a TF to translate the MSGin5G message to a legacy 3GPP message format or a non-3GPP message format.

14 Claims, 7 Drawing Sheets

(51) Int. Cl.
*H04W 60/00* (2009.01)
*H04W 88/16* (2009.01)
*H04W 84/04* (2009.01)

(56) References Cited

U.S. PATENT DOCUMENTS

| | | | |
|---|---|---|---|
| 11,337,044 B2* | 5/2022 | Huang | H04W 4/18 |
| 11,595,860 B2* | 2/2023 | Kiss | H04W 60/005 |
| 11,689,970 B2* | 6/2023 | Wu | H04W 80/02 |
| | | | 370/331 |
| 2008/0045246 A1 | 2/2008 | Murtagh et al. | |
| 2009/0125595 A1 | 5/2009 | Maes | |
| 2020/0037220 A1 | 1/2020 | Velev et al. | |
| 2020/0374251 A1 | 11/2020 | Warshaw | |
| 2021/0258275 A1* | 8/2021 | Starsinic | H04L 67/12 |
| 2021/0392476 A1* | 12/2021 | Berger | H04W 12/06 |
| 2022/0070661 A1* | 3/2022 | Liu | H04L 12/00 |
| 2022/0070950 A1* | 3/2022 | Szilágyi | H04W 76/14 |
| 2022/0095203 A1* | 3/2022 | Xiong | H04W 48/02 |
| 2022/0095262 A1* | 3/2022 | Kazaz | H04L 5/0048 |
| 2022/0116770 A1* | 4/2022 | Li | H04W 12/06 |
| 2023/0037031 A1* | 2/2023 | Wang | H04W 8/08 |

OTHER PUBLICATIONS

Office Action dated Jun. 23, 2022 in connection with India Patent Application No. 202041037179, 5 pages.
International Search Report of the International Searching Authority dated Nov. 30, 2021, in connection with International Application No. PCT/KR2021/011526, 3 pages.
3GPP TR 23.700-24 V0.7.0 (Aug. 2020), Technical Report, 3rd Generation Partnership Project; Technical Specification Group Services and System Aspects; Study on support of the 5GMSG Service; (Release 17), Aug. 2020, 60 pages.
AT&T, "Clarification and corrections to Clause 7," S6-201279, 3GPP TSG-SA WG6 Meeting #38-e, e-meeting, Jul. 20-31, 2020, 6 pages.
Huawei, "Alignment on item names," S6-201005, 3GPP TSG-SA WG6 Meeting #38-e, e-meeting, Jul. 20-31, 2020, 18 pages.

* cited by examiner

METHOD, MSG IN 5G SERVER, AND NON-MSG IN 5G GATEWAY FOR PROVIDING MESSAGING SERVICE IN 5G SYSTEM

CROSS-REFERENCE TO RELATED APPLICATIONS

This application is based on and claims priority under 35 U.S.C. § 119(a) of an Indian Provisional patent application number 202041037179 filed on Aug. 28, 2020, in the Indian Patent Office, and an Indian Non-Provisional patent application number 202041037179 filed on Aug. 13, 2021, in the Indian Patent Office, the disclosure of each of which is incorporated by reference herein in its entirety.

BACKGROUND

1. Field

The present disclosure relates to a wireless network, and more specifically related to a method, an MSGin5G server, and a non-MSGin5G gateway for providing messaging service in 5G system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, 3rd generation partnership project (3GPP) is presently describing message in 5th generation (MSGin5G) application service as a messaging service in a 5G system. Application architecture for the MSGin5G application service, as specified in 3GPP TS 23.554, is anticipated to support a variety of user equipment (UE) types, based on underlying transport services (e.g., an MSGin5G transport service, a non-MSGin5G transport service) supported by the UE. The UE types include an MSGin5G UE, a Legacy 3GPP UE, and a Non-3GPP UE.

The MSGin5G UE supports MSGin5G client and is able to send an MSGin5G message payload. While the legacy 3GPP UE does not support MSGin5G and instead uses one of the 3GPP-defined message delivery mechanisms (e.g., short message service (SMS), a non-IP data delivery (NIDD), broadcast, etc.). Furthermore, the non-3GPP UE does not support the MSGin5G client but does support one of the non-3GPP message delivery mechanisms (e.g., a rich communication services (RCS) and a lightweightM2M (LwM2M), etc.). Thus, it is desired to provide a useful alternative for delivering message/MSGin5G message payload in the 5G system.

The principal object of the embodiments herein is to determine whether a target UE supports an MSGin5G transport service using a target resolution function (TRF) of an MSGin5G server upon receiving an MSGin5G message request from a source UE to deliver a message to the target UE in a wireless network. Further, the MSGin5G server sends the message to the target UE in response to determining that the target UE supports the MSGin5G transport service. Furthermore, the MSGin5G server selects a non-MSGin5G gateway in the wireless network using a gateway selection function (GWSF) of the MSGin5G server in response to determining that the target UE does not support the MSGin5G transport service. Furthermore, the MSGin5G server sends the message to the non-MSGin5G gateway, where the non-MSGin5G gateway translates the MSGin5G message request according to a non-MSGin5G transport service using a translation function (TF) of the non-MSGin5G gateway and the non-MSGin5G gateway sends the message to the target UE after translation. As a result, even if the target UE does not support an MSGin5G message payload/MSGin5G client, the source UE (i.e., MSGin5G UE) sends the message to the target UE (e.g., MSGin5G UE, Legacy 3GPP UE, Non-3GPP UE, etc.) and the target UE does not require any external hardware to communicate with the source UE.

Another object of the embodiment herein is to determine whether the target UE is registered in a MSGin5G UE registration repository of the MSGin5G server. Furthermore, the MSGin5G server detects that the target UE supports the MSGin5G transport service in response to determining that the target UE is registered in the MSGin5G UE registration repository of the MSGin5G server. Furthermore, the MSGin5G server detects that the target UE supports the non-MSGin5G transport service in response to determining that the target UE is not registered in the MSGin5G UE registration repository of the MSGin5G server.

Another object of the embodiment herein is to detect that the target UE is one of a legacy 3GPP UE and a non-3GPP UE based on a UE registration repository of a home subscriber MSGin5G server (HSS) and/or a unified data management (UDM) in a wireless network.

SUMMARY

Accordingly, embodiments herein disclose a method for delivering a 5th generation messages (MSGin5G) in a wireless network. The method includes receiving, by an MSGin5G server, an MSGin5G message request from a source UE to deliver a message to a target UE in the wireless network. Further, the method includes determining, by the MSGin5G server, whether the target UE supports an MSGin5G transport service using a TRF (based on MSGin5G service identity of the target UE) of the MSGin5G server upon receiving the MSGin5G message request from the source UE. Further, the method includes sending the message to the target UE in response to determining that the target UE supports the MSGin5G transport service. Further, the method includes selecting a non-MSGin5G gateway in the wireless network using a GWSF of the MSGin5G server in response to determining that the target UE does not support the MSGin5G transport service. Further, the method includes sending the message to the non-MSGin5G gateway, where the non-MSGin5G gateway translates the MSGin5G message request according to a non-MSGin5G transport service using a TF of the non-MSGin5G gateway and the non-MSGin5G gateway sends the message to the target UE after translation.

In an embodiment, the MSGin5G message request comprises an MSGin5G service identify (ID) of the source UE, an MSGin5G service ID of the target UE, and message ID information, a delivery status, an application ID, a payload, and priority type information elements.

In an embodiment, the non-MSGin5G transport service comprises a legacy 3GPP transport service and/or a non-3GPP transport service.

In an embodiment, the non-MSGin5G gateway comprises a legacy 3GPP message gateway and/or a non-3GPP message gateway.

In an embodiment, the legacy 3GPP message gateway is used to deliver the message to the target UE using the 3GPP transport service and the non-3GPP message gateway is used to deliver the message to the target UE using the non-3GPP transport service.

In an embodiment, the source UE is an MSGin5G UE and the target UE is the MSGin5G UE and a non-MSGin5G UE, and where the MSGin5G UE supports the MSGin5G transport service and the target UE supports the MSGin5G transport service and/or the non-MSGin5G transport service.

In an embodiment, the non-MSGin5G UE is a legacy 3GPP UE and/or a non-3GPP UE.

In an embodiment, where determining, by the MSGin5G server, whether the target UE supports the MSGin5G transport service using the TRF (based on MSGin5G service identity of the target UE) of the MSGin5G server upon receiving the MSGin5G message request from the source UE includes determining, by the MSGin5G server, whether the target UE is registered in a MSGin5G UE registration repository of the MSGin5G server. Further, the method includes detecting that the target UE supports the MSGin5G transport service in response to determining that the target UE is registered in the MSGin5G UE registration repository of the MSGin5G server. Further, the method includes detecting that the target UE supports the non-MSGin5G transport service in response to determining that the target UE is not registered in the MSGin5G UE registration repository of the MSGin5G server.

In an embodiment, where detecting that the target UE supports the legacy 3GPP transport service includes detecting, by the MSGin5G server, that the target UE is registered in a UE registration repository of an HSS and/or a UDM in the wireless network.

In an embodiment, where detecting that the target UE supports the non-3GPP transport service includes detecting, by the MSGin5G server, that the target UE is not registered in the MSGin5G UE registration repository and is not registered in a registration repository of the HSS and/or the UDM in the wireless network In an embodiment, where selecting the non-MSGin5G gateway in the wireless network using the GWSF of the MSGin5G server includes selecting, by the MSGin5G server, one of the legacy 3GPP message gateway and the non-3GPP message gateway based on the mapping table available at the GWSF. Further, the method includes performing, by the MSGin5G server, an authentication of the source UE. Further, the method includes sending, by the MSGin5G server, the message to one of the legacy 3GPP message gateway and the non-3GPP message gateway based on selection.

In an embodiment, where translating the MSGin5G message request according to non-MSGin5G transport service using the TF includes detecting, by the MSGin5G server, that the legacy 3GPP message gateway is selected. Further, the method includes determining, by the legacy 3GPP message gateway, a message delivery mechanism to send the message to the target UE based on a capability of the target UE, a communication status of the target UE, and a service configuration of the target UE, where the message delivery mechanism is one of an SMS and a NIDD. Further, the method includes performing, by the legacy 3GPP message gateway, registration and de-registration with the MSGin5G server for the non-MSGin5G UE. Further, the method includes performing, by the legacy 3GPP message gateway, a segmentation of the message and reassembling of the message for the non-MSGin5G UE. Further, the method includes performing, by the legacy 3GPP message gateway, conversion of an address of the target UE. Further, the method includes translating, by the legacy 3GPP message gateway, protocols, and non-message payload information of the message based on the determined message delivery mechanism. Further, the method includes sending, by the legacy 3GPP message gateway, the message to the target UE.

In an embodiment, the legacy 3GPP message gateway receives delivery report from the target UE and translate the received delivery report into an MSGin5G message delivery report and sends an MSGin5G message delivery report to the MSGin5G server.

In an embodiment, where translating the MSGin5G message request according to non-MSGin5G transport service using the TF includes detecting, by the MSGin5G server, that the non-3GPP message gateway is selected. Further, the method includes determining, by the non-3GPP message gateway, a message delivery mechanism to send the message to the target UE based on a capability of the target UE, a communication status of the target UE, and a service configuration of the target UE, where the message delivery mechanism is one of an RCS and an LwM2M. Further, the method includes translating, by non-3GPP message gateway, the message into a non-3GPP message based on the determined message delivery mechanism. Further, the method includes sending, by the non-3GPP message gateway, the message to the target UE.

In an embodiment, the non-3GPP message gateway receives a delivery report from the target UE and translates the received delivery report into an MSGin5G message delivery report and sends an MSGin5G message delivery report to the MSGin5G server.

Accordingly, embodiments herein disclose the MSGin5G server for delivering the MSGin5G message in the wireless network. The MSGin5G server includes an MSGin5G controller coupled with a processor and a memory. The MSGin5G controller is configured to receive the MSGin5G message request from the source UE to deliver the message to the target UE in the wireless network. Further, the MSGin5G controller is configured to determine whether the target UE supports the MSGin5G transport service using the TRF (based on MSGin5G service identity of the target UE) of the MSGin5G server upon receiving the MSGin5G message request from the source UE. Further, the MSGin5G controller is configured to send the message to the target UE in response to determining that the target UE supports the MSGin5G transport service. Further, the MSGin5G controller is configured to select the non-MSGin5G gateway in the wireless network using the GWSF of the MSGin5G server in response to determining that the target UE does not support the MSGin5G transport service. Further, the MSGin5G controller is configured to send the message to the non-MSGin5G gateway.

Accordingly, embodiments herein disclose the non-MSGin5G gateway for delivering the MSGin5G message in the wireless network. The non-MSGin5G gateway includes an MSGin5G controller coupled with a processor and a memory. The MSGin5G controller is configured to translate the MSGin5G message request according to the non-MSGin5G transport service using the TF of the non-MSGin5G gateway and the non-MSGin5G gateway sends the message to the target UE after translation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The present disclosure is illustrated in the accompanying drawings, throughout which like reference letters indicate corresponding parts in the various figures. The embodiments herein will be better understood from the following description with reference to the drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, embodiments herein disclose a method for delivering a 5th generation messages (MSGin5G) in a wireless network. The method includes receiving, by an MSGin5G server, an MSGin5G message request from a source UE to deliver a message to a target UE in the wireless network. Further, the method includes determining, by the MSGin5G server, whether the target UE supports an MSGin5G transport service using a TRF (based on MSGin5G service identity of the target UE) of the MSGin5G server upon receiving the MSGin5G message request from the source UE. Further, the method includes sending the message to the target UE in response to determining that the target UE supports the MSGin5G transport service. Further, the method includes selecting a non-MSGin5G gateway in the wireless network using a GWSF of the MSGin5G server in response to determining that the target UE does not support the MSGin5G transport service. Further, the method includes sending the message to the non-MSGin5G gateway, where the non-MSGin5G gateway translates the MSGin5G message request according to a non-MSGin5G transport service using a TF of the non-MSGin5G gateway and the non-MSGin5G gateway sends the message to the target UE after translation.

Accordingly, embodiments herein disclose the MSGin5G server for delivering the MSGin5G message in the wireless network. The MSGin5G server includes an MSGin5G controller coupled with a processor and a memory. The MSGin5G controller is configured to receive the MSGin5G message request from the source UE to deliver the message to the target UE in the wireless network. Further, the MSGin5G controller is configured to determine whether the target UE supports the MSGin5G transport service using the TRF (based on MSGin5G service identity of the target UE) of the MSGin5G server upon receiving the MSGin5G message request from the source UE. Further, the MSGin5G controller is configured to send the message to the target UE in response to determining that the target UE supports the MSGin5G transport service. Further, the MSGin5G controller is configured to select the non-MSGin5G gateway in the wireless network using the GWSF of the MSGin5G server in response to determining that the target UE does not support the MSGin5G transport service. Further, the MSGin5G controller is configured to send the message to the non-MSGin5G gateway.

Accordingly, embodiments herein disclose the non-MSGin5G gateway for delivering the MSGin5G message in the wireless network. The non-MSGin5G gateway includes an MSGin5G controller coupled with a processor and a memory. The MSGin5G controller is configured to translate the MSGin5G message request according to the non-MSGin5G transport service using the TF of the non-MSGin5G gateway and the non-MSGin5G gateway sends the message to the target UE after translation.

Legacy 3 GPP UE does not support MSGin5G and instead uses one of the 3GPP-defined message delivery mechanisms (e.g., SMS, a NIDD), broadcast, etc.). Furthermore, a non-3GPP UE does not support the MSGin5G client but does support one of the non-3GPP message delivery mechanisms (e.g., an RCS and a LwM2M, etc.).

The provided method in the present disclosure allows an MSGin5G server to determine whether the target UE supports an MSGin5G transport service using the TRF (based on MSGin5G service identity of the target UE) of the MSGin5G server upon receiving the MSGin5G message request from the source UE to deliver the message (i.e., MSGin5G message) to the target UE in the wireless network. Furthermore, the MSGin5G server sends the message to the target UE in response to determining that the target UE supports the MSGin5G transport service. Furthermore, the MSGin5G server selects the non-MSGin5G gateway in the wireless network using the GWSF of the MSGin5G server in response to determining that the target UE does not support the MSGin5G transport service. Furthermore, the MSGin5G server sends the message to the non-MSGin5G gateway, where the non-MSGin5G gateway translates the MSGin5G message request according to the non-MSGin5G transport service using the TF of the non-MSGin5G gateway and the non-MSGin5G gateway sends the message to the target UE after translation. As a result, even if the target UE does not support an MSGin5G message payload/MSGin5G client, the source UE (i.e., MSGin5G UE) sends the message to the target UE (e.g., MSGin5G UE, legacy 3GPP UE, non-3GPP UE, etc.) and the target UE does not require any external hardware to communicate with the source UE.

The provided method in the present disclosure allows the MSGin5G server to determine whether MSGin5G service identity of the target UE is registered in a MSGin5G UE registration repository of the MSGin5G server. Furthermore, the MSGin5G server detects that the target UE supports the MSGin5G transport service in response to determining that the target UE is registered in the MSGin5G UE registration repository of the MSGin5G server. Furthermore, the MSGin5G server detects that the target UE supports the non-MSGin5G transport service in response to determining that the target UE is not registered in the MSGin5G UE registration repository of the MSGin5G server.

The provided method in the present disclosure allows the MSGin5G server to detect that the target UE is one of a legacy 3GPP UE and a non-3GPP UE based on a UE registration repository of an HSS and/or a UDM in the wireless network.

Referring now to the drawings and more particularly to FIGS. 1 through 6, where similar reference characters denote corresponding features consistently throughout the figures, there are shown preferred embodiments.

Figure 1:
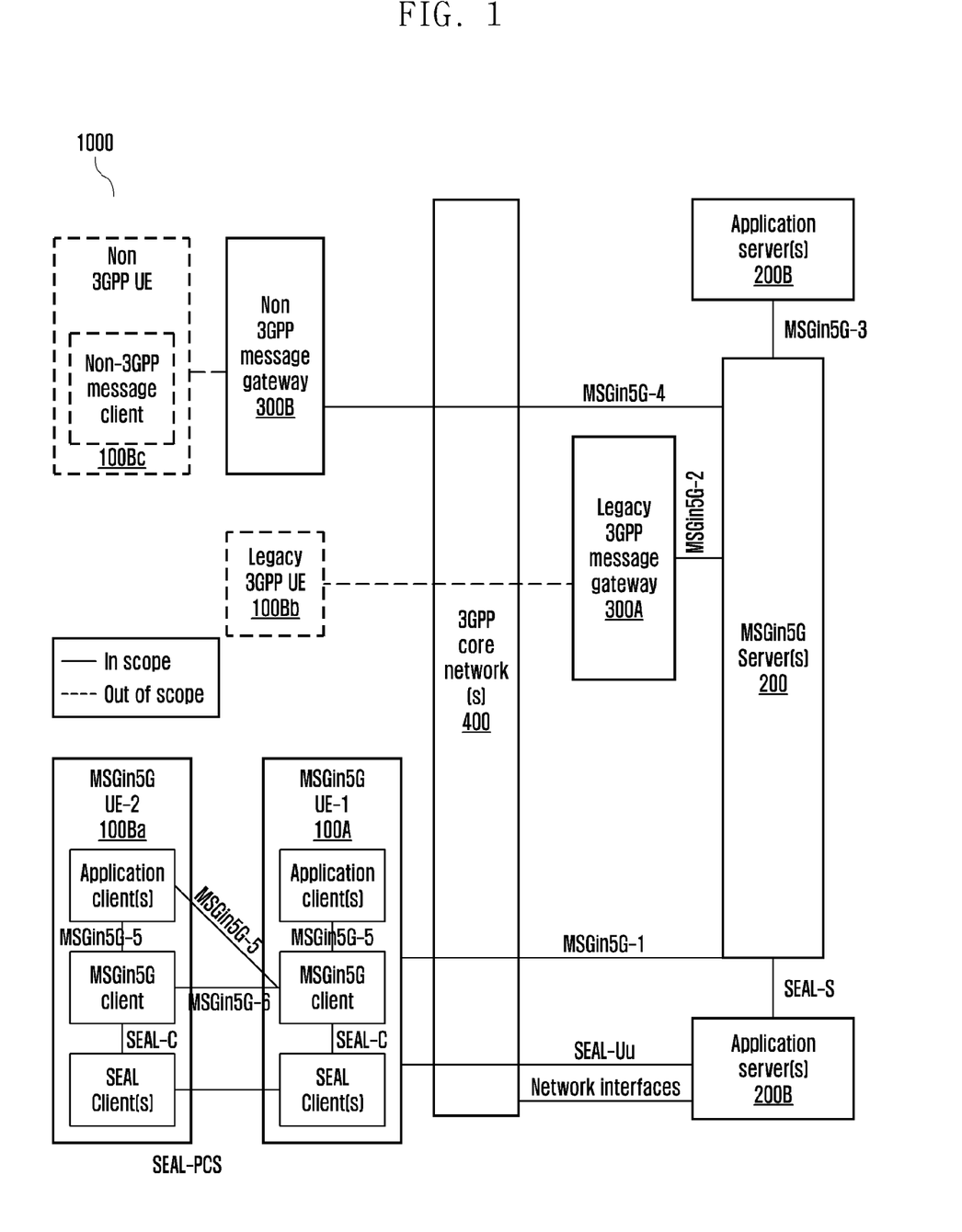
FIG. 1 illustrates an architecture of an MSGin5G application service as specified in 3GPP TS 23.554 v0.3.0, according to the embodiments as disclosed herein.

FIG. 1 illustrates an architecture of an MSGin5G application service (1000) as specified in 3GPP TS 23.554 according to the embodiments as disclosed herein. The MSGin5G application service (1000) includes an MSGin5G server (200), a SEAL server(s) (200A), an application server(s) (200B), a source UE (100A) (i.e., MSGin5G UE-1), a target UE (100B) (MSGin5G UE-2 (100Ba) or a legacy 3GPP UE (100Bb) or a non-3GPP UE (100Bc)), a non-MSGin5G gateway (300) (a legacy 3GPP message gateway (300A) or a non-3GPP message gateway (300B)), a 3GPP core network(s) (400).

In an embodiment, the MSGin5G server (200) provides server-side functionality to assist an MSGin5G clients (e.g., MSGin5G UE-1 (100A), MSGin5G UE-2 (100Ba) etc.) with sending and receiving of message(s) via MSGin5G Service to/from the application server(s) (200B) and/or other MSGin5G service endpoints on other UEs (e.g., the legacy 3GPP UE (100Bb), the non-3GPP UE (100Bc), etc.). To resolve a message delivery mechanism for the MSGin5G service endpoint based on a terminating MSGSin5G service ID to determine, by the MSGin5G server (200), if the message(s) is to be delivered to the target UE (100B), the application server(s) (200B) or the non-MSGin5G gateway (300) for final delivery.

In an embodiment, the MSGin5G server (200) includes a TRF (241) and a GWSF (242), not shown in FIG. 1. The TRF (241) provides functionality to assist the MSGin5G server (200) to determine transport service(s) supported by the target UE (100B). Upon receiving an MSGin5G message request, the TRF (241) checks a MSGin5G UE registration repository (database created at the time of each MSGin5G UE (e.g., MSGin5G UE-1 (100A), MSGin5G UE-2 (100Ba), etc.) registration to the MSGin5G server (200)) of the MSGin5G server (200) for a target endpoint identifier (i.e., the target UE (100B)). If the target endpoint identifier is found in the repository, then the transport service(s) supported by the target UE (100B) is confirmed as the MSGin5G UE and can understand an MSGin5G message payload. If the target endpoint identifier is not found in the repository, the MSGin5G server (200) checks a repository at HSS/UDM for the target endpoint identifier. If the target endpoint identifier is found in the repository of the HSS/UDM, then the transport service(s) supported by the target UE (100B) is determined as a non-MSGin5G transport service and need for support of the non-MSGin5G gateway (300) to understand the MSGin5G message payload.

Furthermore, the GWSF (242) provides functionality to assist the MSGin5G server (200) to determine the non-MSGin5G gateway (300) (the legacy 3GPP message gateway (300A) or the non-3GPP message gateway (300B)) suitable to the transport service(s) supported by the target UE (100B). Upon receiving the transport service(s) determined by the TRF (241) and supported by the target UE (100B), the GWSF (242) selects the corresponding the non-MSGin5G gateway (300) (the legacy 3GPP message gateway (300A) or the non-3GPP message gateway (300B)) based on a mapping table available on the GWSF (242).

In an embodiment, the non-MSGin5G gateway (300) (the legacy 3GPP message gateway (300A) and/or the non-3GPP message gateway (300B)) includes a TF (341), not shown in FIG. 1. The TF (341) performs conversion of the address of the target UE (100B) that is understood in a destination domain and conversion of protocols and payload according to the transport service(s) supported by the target UE (100B).

In an embodiment, the non-MSGin5G gateway (300) in MSGin5G application architecture provides functionality to deliver MSGin5G messages to non-MSGin5G UEs (i.e., the legacy 3GPP UE (100Bb) and the non-3GPP UE (100Bc)). The non-MSGin5G gateway (300) performs a role of interconnecting two different messaging delivery mechanisms and assures message integrity between different message delivery mechanisms. A message delivery mechanism comprises a specific set of protocols, procedures, and rules.

In an embodiment, the non-MSGin5G gateway (300) enables seamless delivery of the MSGin5G message between different message delivery mechanisms with integrity. Furthermore, the non-MSGin5G gateway (300) communicates with the MSGin5G server (200) using either the MSGin5G client functionality or similar functions to enable sending and receiving the MSGin5G messages. Furthermore, the non-MSGin5G gateway (300) delivers a payload of the MSGin5G message to the non-MSGin5G UE (i.e., the legacy 3GPP UE (100Bb) and the non-3GPP UE (100Bc)) using the specific message delivery mechanism available to that non-MSGin5G UE and vice versa. Furthermore, the non-MSGin5G gateway (300) performs message sender and receiver addresses conversion according to the two connected message delivery mechanisms and maintain a mapping of the address pair used for a response message delivery. Furthermore, the non-MSGin5G gateway (300) performs registration and de-registration with the MSGin5G server (200) on behalf of the non-MSGin5G UEs. Furthermore, the non-MSGin5G gateway (300) acts as a service endpoint to perform message segmentation and reassembly for the non-MSGin5G UEs when needed. Furthermore, the non-MSGin5G gateway (300) performs protocol and non-message payload information conversion according to the service supported by the target UE (100B).

In an embodiment, the legacy 3GPP message gateway (300A) is used to deliver the MSGin5G message to the Legacy 3GPP UEs (100Bb), using their 3GPP supported message delivery mechanisms. Furthermore, the non-3GPP message gateway (300B) is used to deliver the MSGin5G message to non-3GPP UEs (100Bc), using their (non-3GPP) supported message delivery mechanisms.

In an embodiment, the TRF (241) and the GWSF (242) are residing in the MSGin5G server (200) and the TF (341) resides in the message gateway. In this embodiment, each of logical functions (the TRF (241), the GWSF (242) and the TF (341)) performs their respective roles and the functionality over interface which is internal to MSGin5G server (200).

In an embodiment, all the logical functions (the TRF (241), the GWSF (242) and the TF (341)) can be co-located with another entity in the MSGin5G application service (1000) and in such cases; the related interface functionality is internal to the entity hosting the logical function.

Figure 2A:
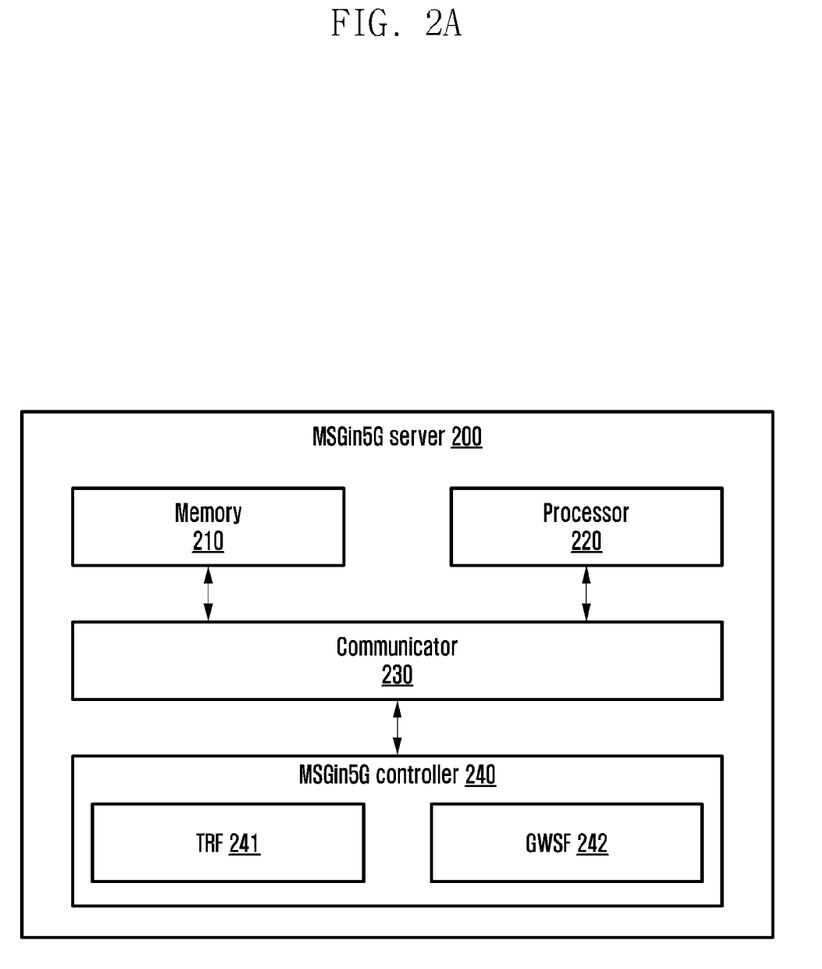
FIG. 2A illustrates a block diagram of an MSGin5G server for delivering an MSGin5G message in a wireless network, according to an embodiment as disclosed herein.

FIG. 2A illustrates a block diagram of the MSGin5G server (200) for delivering the MSGin5G message in the wireless network according to an embodiment as disclosed herein.

In an embodiment, the MSGin5G server (200) includes a memory (210), a processor (220), a communicator (230), and an MSGin5G controller (240).

The memory (110) stores the MSGin5G service identify (ID) of the source UE (100A), an MSGin5G service ID of the target UE (100B), and message ID information elements, the message ID information, a delivery status, an application ID, a payload, priority type information elements, and MSGin5G UE registration repository. Further, the memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information. In certain examples, a non-transitory storage medium may store data that can, over time, change (e.g., in random access memory (RAM) or cache). The memory (210) can be an internal storage unit or the memory can be an external storage unit of the MSGin5G server (200), a cloud storage, or any other type of external storage.

The processor (220) communicates with the memory (210), the communicator (230), and the MSGin5G controller (240). The processor (220) is configured to execute instructions stored in the memory (210) and to perform various processes. The processor (220) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

The communicator (230) includes an electronic circuit specific to a standard that enables wired or wireless communication. The communicator (230) is configured for communicating internally between internal hardware components and with external devices via one or more networks.

In an embodiment, the MSGin5G controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the MSGin5G controller (240) includes the TRF (241) and the GWSF (242). The MSGin5G controller (240) is configured to receive the MSGin5G message request from the source UE (100A) to deliver the message to the target UE (100B) in the wireless network. Further, the MSGin5G controller (240) is configured to determine whether the target UE (100B) supports the MSGin5G transport service using the TRF (241) of the MSGin5G server (200) upon receiving the MSGin5G message request from the source UE (100A). Further, the MSGin5G controller (240) is configured to send the message to the target UE (100B) in response to determining that the target UE (100B) supports the MSGin5G transport service. Further, the MSGin5G controller (240) is configured to select the non-MSGin5G gateway (300) in the wireless network using the GWSF (242) of the MSGin5G server (200) in response to determining that the target UE (100B) does not support the MSGin5G transport service. Further, the MSGin5G controller (240) is configured to send the message to the non-MSGin5G gateway (300).

Further, the MSGin5G controller (240) is configured to determine whether the target UE (100B) is registered in the MSGin5G UE registration repository of the MSGin5G server (200). Further, the MSGin5G controller (240) is configured to detect that the target UE (100B) supports the MSGin5G transport service in response to determining that the target UE (100B) is registered in the MSGin5G UE registration repository of the MSGin5G server (200). Further, the MSGin5G controller (240) is configured to detect that the target UE (100B) supports the non-MSGin5G transport service in response to determining that the target UE (100B) is not registered in the MSGin5G UE registration repository of the MSGin5G server (200).

Further, the MSGin5G controller (240) is configured to detect that the target UE (100B) is registered in the UE registration repository of the HSS and/or the UDM in the wireless network. Further, the MSGin5G controller (240) is configured to select one of the legacy 3GPP message gateway (300A) and the non-3GPP message gateway (300B). Further, the MSGin5G controller (240) is configured to perform an authentication of the source UE (100A). Further, the MSGin5G controller (240) is configured to send the message to one of the legacy 3GPP message gateway (300A) and the non-3GPP message gateway (300B) based on selection.

Although the FIG. 2A shows various hardware components of the MSGin5G server (200) but it is to be understood that other embodiments are not limited thereon. In other embodiments, the MSGin5G server (200) may include less or more number of components. Further, the labels or names of the components are used only for illustrative purpose and does not limit the scope of the disclosure. One or more components can be combined together to perform same or substantially similar function to deliver the MSGin5G in the wireless network.

Figure 2B:
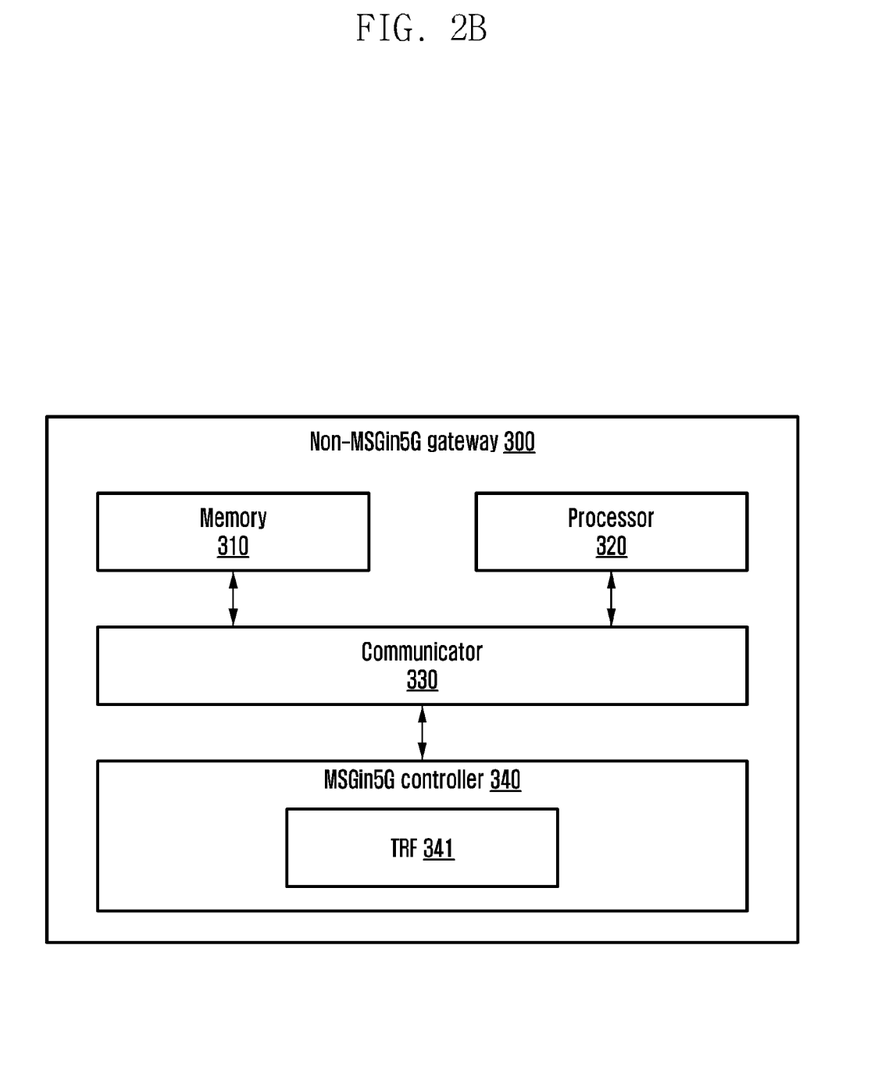
FIG. 2B illustrates a block diagram of a non-MSGin5G gateway for delivering the MSGin5G message in the wireless network, according to an embodiment as disclosed herein.

FIG. 2B illustrates a block diagram of the non-MSGin5G gateway (300) for delivering the MSGin5G message in the wireless network, according to an embodiment as disclosed herein.

In an embodiment, the non-MSGin5G gateway (300) includes a memory (310), a processor (320), a communicator (330), and an MSGin5G controller (340).

The memory (310) stores the MSGin5G service identify (ID) of the source UE (100A), an MSGin5G service ID of the target UE (100B), and message ID information, a delivery status, an application ID, a payload, priority type information elements, and UE registration repository of the HSS and the UDM. Further, the memory (310) also stores instructions to be executed by the processor (320). The memory (310) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (310) may, in some examples, be considered a non-transitory storage medium. The term "non-transitory" may indicate that the storage medium is not embodied in a carrier wave or a propagated signal. However, the term "non-transitory" should not be interpreted that the memory (310) is non-movable. In some examples, the memory (310) can be configured to store larger amounts of information. In certain examples, a non-transitory storage medium may store data that can, over time, change (e.g., in Random Access Memory (RAM) or cache). The memory (310) can be an internal storage unit or the memory (310)

can be an external storage unit of the non-MSGin5G gateway (300), a cloud storage, or any other type of external storage.

The processor (320) communicates with the memory (310), the communicator (330), and the MSGin5G controller (340). The processor (220) is configured to execute instructions stored in the memory (310) and to perform various processes. The processor (320) may include one or a plurality of processors, maybe a general-purpose processor, such as a CPU, an AP, or the like, a graphics-only processing unit such as a GPU, a VPU, and/or an AI dedicated processor such as an NPU.

The communicator (330) includes an electronic circuit specific to a standard that enables wired or wireless communication. The communicator (330) is configured for communicating internally between internal hardware components and with external devices via one or more networks.

In an embodiment, the MSGin5G controller (340) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the MSGin5G controller (340) includes the TF (341). The MSGin5G controller (340) is configured to translate the MSGin5G message request according to the non-MSGin5G transport service using the TF (341) of the non-MSGin5G gateway (300) and the non-MSGin5G gateway (300) sends the message to the target UE (100B) after translation.

Further, the MSGin5G controller (340) is configured to determine the message delivery mechanism to send the message to the target UE (100B) based on the capability of the target UE (100B), the communication status of the target UE (100B), and the service configuration of the target UE (100B), where the message delivery mechanism is one of the SMS and the NIDD. Further, the MSGin5G controller (340) is configured to perform the registration and the de-registration with the MSGin5G server (200) for the non-MSGin5G UE. Further, the MSGin5G controller (340) is configured to perform the segmentation of the message and reassembling of the message for the non-MSGin5G UE. Further, the MSGin5G controller (340) is configured to perform conversion of an address of the target UE (100B). Further, the MSGin5G controller (340) is configured to translate protocols, and non-message payload information of the message based on the determined message delivery mechanism. Further, the MSGin5G controller (340) is configured to send the message to the target UE (100B). Further, the MSGin5G controller (340) is configured to send the MSGin5G message delivery report to the MSGin5G server (200).

Further, the MSGin5G controller (340) is configured to determine the message delivery mechanism to send the message to the target UE (100B) based on the capability of the target UE (100B), the communication status of the target UE (100B), and the service configuration of the target UE (100B), where the message delivery mechanism is one of the RCS and the LwM2M. Further, the MSGin5G controller (340) is configured to translate the message into the non-3GPP message based on the determined message delivery mechanism. Further, the MSGin5G controller (340) is configured to send the message to the target UE (100B). Further, the MSGin5G controller (340) is configured to send the MSGin5G message delivery report to the MSGin5G server (200).

Although the FIG. 2B various hardware components of the non-MSGin5G gateway (300) but it is to be understood that other embodiments are not limited thereon. In other embodiments, the non-MSGin5G gateway (300) may include less or more number of components. Further, the labels or names of the components are used only for illustrative purpose and does not limit the scope of the disclosure. One or more components can be combined together to perform same or substantially similar function to deliver the MSGin5G in the wireless network.

Figure 3:
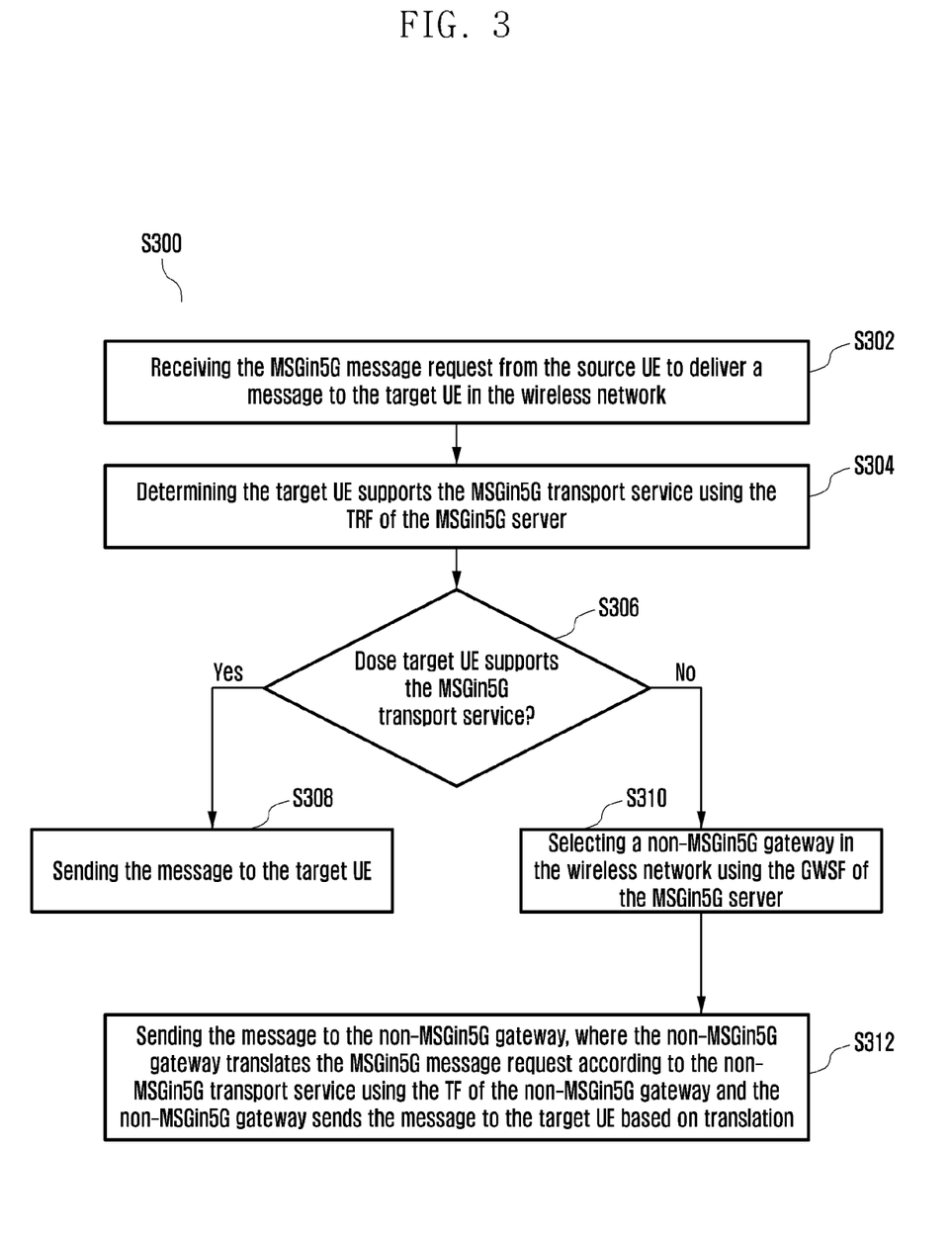
FIG. 3 is a flow diagram illustrating a method for delivering the MSGin5G message in the wireless network, according to an embodiment as disclosed herein.

FIG. 3 is a flow diagram (S300) illustrating a method for delivering the MSGin5G message in the wireless network, according to an embodiment as disclosed herein. The operations (S302-S312) are performed by the MSGin5G server (200) and the non-MSGin5G gateway (300).

At S302, the method includes receiving the MSGin5G message request from the source UE (100A) to deliver the message to the target UE (100B) in the wireless network. At S304, the method includes determining whether the target UE (100B) supports the MSGin5G transport service using the TRF (based on MSGin5G service identity of the target UE) of the MSGin5G server (200). At S306, the method includes determining action (e.g., S308, S310) based on whether the target UE (100B) supports the MSGin5G transport service using a TRF (241) of the MSGin5G server (200) upon receiving the MSGin5G message request from the source UE (100A). At S308, the method includes sending the message to the target UE (100B) in response to determining that the target UE (100B) supports the MSGin5G transport service.

At S310, the method includes selecting the non-MSGin5G gateway (300) in the wireless network using the GWSF (242) of the MSGin5G server (200) in response to determining that the target UE (100B) does not support the MSGin5G transport service. At S312, the method includes sending the message to the non-MSGin5G gateway (300), where the non-MSGin5G gateway (300) translates the MSGin5G message request according to the non-MSGin5G transport service using the TF (341) of the non-MSGin5G gateway (300) and the non-MSGin5G gateway (300) sends the message to the target UE (100B) after translation.

The various actions, acts, blocks, steps, or the like in the flow diagram (S300) may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
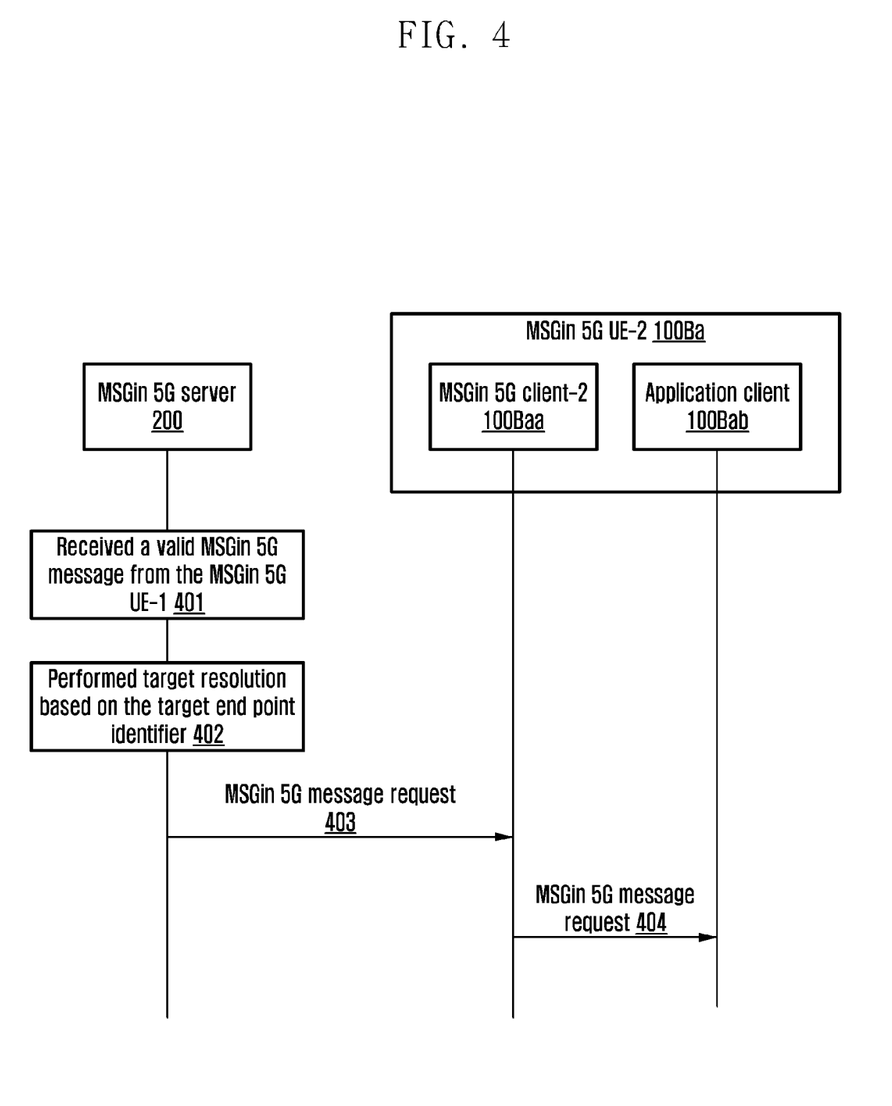
FIG. 4 is a sequence diagram illustrating various operations for sending the MSGin5G message from a source UE to a target UE in the wireless network where both the source UE and the target UE support an MSGin5G transport service, according to an embodiment as disclosed herein.

FIG. 4 is a sequence diagram illustrating various operations for sending the MSGin5G message from the source UE (100A) to the target UE (100B) in the wireless network where both the source UE (100A) and the target UE (100B) support the MSGin5G transport service, according to an embodiment as disclosed herein.

For this scenario, pre-condition is MSGin5G client-2 of the MSGin5G UE-2 (100Ba)/target UE (100B) is registered to the MSGin5G server (200). At 401, the MSGin5G server (200) has received a valid MSGin5G message from the source UE (100A) (i.e., MSGin5G UE-1). At 402, the TRF (241) checks the registry repository of the MSGin5G server (200) to find the target endpoint identifier as specified in the received MSGin5G message. The TRF (241) finds the registry information about the target endpoint identifier and resolves to send the MSGin5G message to the MSGin5G UE-2 (100Ba) identified by the target endpoint identifier. At

403, the MSGin5G server (200) forwards the MSGin5G message request to the MSGin5G UE-2 (100Ba) (i.e., MSGin5G clien-2 (100Baa)/application client (100Bab)). At 404, the MSGin5G UE-2 (100Ba) delivers contents of the MSGin5G message to the targeted application client/the MSGin5G UE-2 (100Ba)/target UE (100B).

Figure 5:
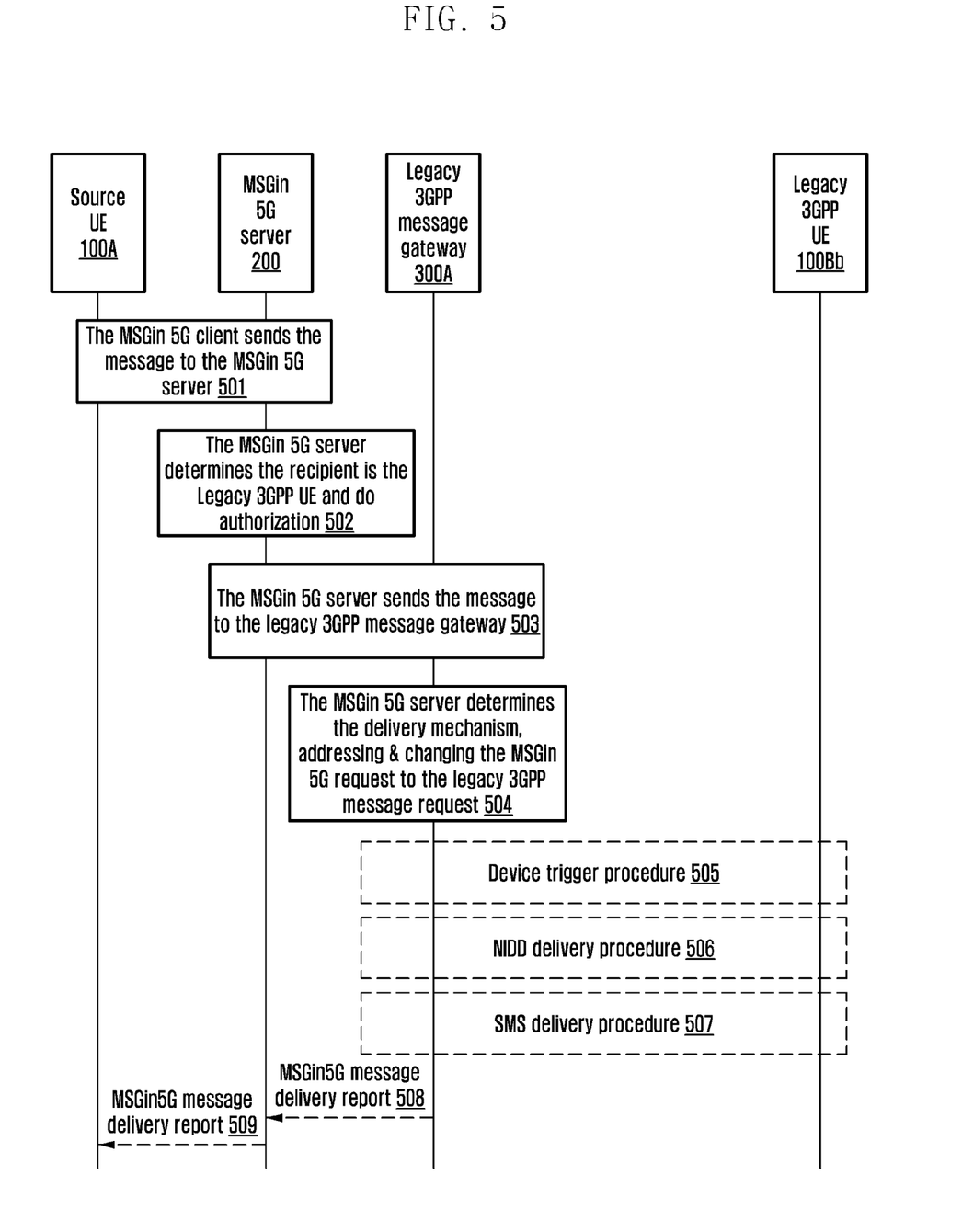
FIG. 5 is a sequence diagram illustrating various operations for sending the MSGin5G message from the source UE to the target UE in the wireless network where the source UE supports the MSGin5G transport service and the target UE acts as legacy 3GPP UE that supports a non-MSGin5G transport service, according to an embodiment as disclosed herein.

FIG. 5 is a sequence diagram illustrating various operations for sending the MSGin5G message from the source UE (100A) to the target UE (100B) in the wireless network where the source UE (100A) supports the MSGin5G transport service and the target UE (100B) acts as the legacy 3GPP UE (100Bb) that supports the non-MSGin5G transport service, according to an embodiment as disclosed herein.

As per 3GPP TS 23.554, for this scenario, pre-conditions are given below:
  i. MSGin5G Client in MSGin5G UE (source UE (100A)) is registered with the MSGin5G server (200);
  ii. The legacy 3GPP message gateway (300A) is aware of the MSGin5G service ID of the legacy 3GPP UE (100Bb) and maintains the mapping to IDs used in a legacy network; and/or
  iii. The MSGin5G server (200) can determine whether the target UE (100B) is the legacy 3GPP UE (100Bb), and which message delivery mechanisms are available.

At 501, the source UE (100A) sends the MSGin5G message request to the MSGin5G server (200). The MSGin5G message request includes an MSGin5G service identify (ID) of the source UE (100A), an MSGin5G service ID of the target UE (100B), message ID information a delivery status, an application ID, a payload, and priority type information elements. At 502, upon receiving the MSGin5G message request, the MSGin5G server (200) determines that the recipient is the legacy 3GPP UE (100Bb) and the MSGin5G client (source UE (100A)) is authorized to send the MSGin5G message to the legacy 3GPP UE (100Bb). At 503, the MSGin5G server (200) forwards the MSGin5G message request to the legacy 3GPP message gateway (300A).

At 504, the legacy 3GPP message gateway (300A) determines which legacy 3GPP message delivery mechanism (e.g., SMS, NIDD, etc.) uses based on a capability of the target UE (100B)/legacy 3GPP UE (100Bb), a communication status of the target UE (100B)/legacy 3GPP UE (100Bb), and a service configuration of the target UE (100B)/legacy 3GPP UE (100Bb), etc. When selected, the legacy 3GPP message gateway (300A) maps the MSGin5G service ID to the corresponding identifier. For example (not an exhaustive list), as given below:
  i. If the legacy 3GPP message gateway (300A) selected the device triggering, the legacy 3GPP message gateway (300A) maps the service ID to MSISDN and Application port ID;
  ii. If the legacy 3GPP message gateway (300A) selected the NIDD delivery mechanism, the legacy 3GPP message gateway (300A) maps the service ID to External Identifier or MSISDN; and/or
  iii. If the legacy 3GPP message gateway (300A) selected the SMS delivery mechanism, the legacy 3GPP message gateway (300A) maps the service ID to MSISDN.

At 505-513, the legacy 3GPP message gateway (300A) sends the payload of the MSGin5G message to the legacy 3GPP UE (100Bb). For example (not an exhaustive list), as given below:
  i. For the device triggering (505), the legacy 3GPP message gateway (300A) maps the payload of the MSGin5G message to one or more device triggering requests (see 3GPP TS 23.682, 3GPP TS 29.122, and 3GPP TS 29.522);
  ii. For the NIDD delivery mechanism (506), the legacy 3GPP message gateway (300A) maps the payload of the MSGin5G message to one or more NIDD submit request messages (see 3GPP TS 23.682, 3GPP TS 29.122, and 3GPP TS 29.522). Alternatively, if tunnel parameters are provisioned in the legacy 3GPP message gateway (see 3GPP TS 23.401, 3GPP TS 23.501, and 3GPP TS 23.502); and/or
  iii. For the SMS delivery mechanism (507), the legacy 3GPP message gateway (300A) sends SMS to the legacy 3GPP UE (100Bb) according to the procedure in 3GPP TS 23.204 or the procedure in 3GPP TS 23.502.

At 508-509, If delivery status required is included in the MSGin5G message request, the legacy 3GPP message gateway (300A) sends MSGin5G message delivery report to the MSGin5G server (200), the MSGin5G server (200) sends the delivery report to the MSGin5G client (source UE (100A)) as specified in 3GPP TS 23.554.

Figure 6:
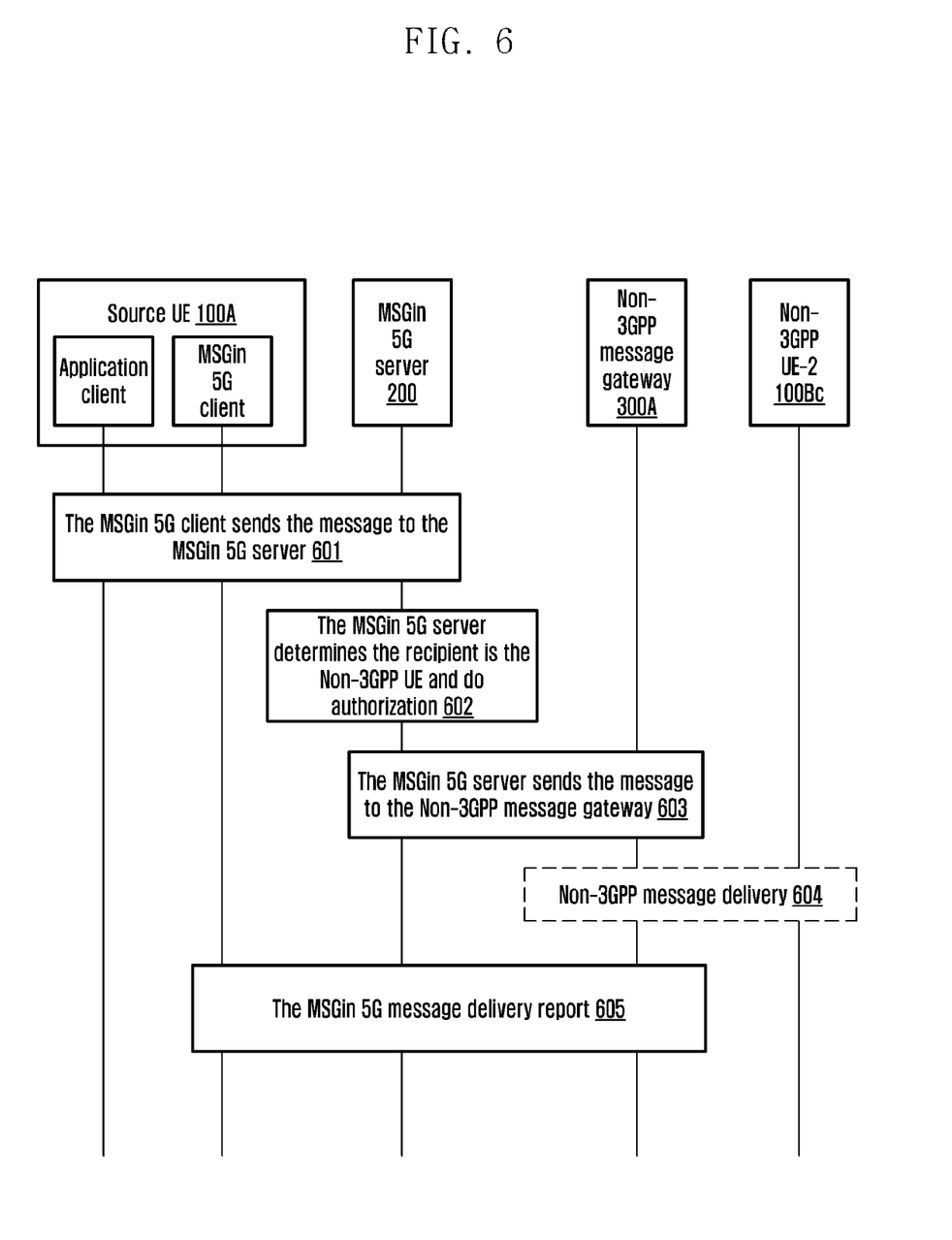
FIG. 6 is a sequence diagram illustrating various operations for sending the MSGin5G message from the source UE to the target UE in the wireless network where the source UE supports the MSGin5G transport service and the target UE acts as non-3GPP UE that supports the non-MSGin5G transport service, according to an embodiment as disclosed herein.

FIG. 6 is a sequence diagram illustrating various operations for sending the MSGin5G message from the source UE (100A) to the target UE (100B) in the wireless network where the source UE (100A) supports the MSGin5G transport service and the target UE (100B) acts as the non-3GPP UE (100Bc) that supports the non-MSGin5G transport service, according to an embodiment as disclosed herein.

As per 3GPP TS 23.554, for this scenario, pre-conditions are given below:
  i. MSGin5G Client in MSGin5G UE (source UE (100A)) is registered with the MSGin5G server (200); and/or
  ii. The on-3GPP message gateway (300B) is aware of the non-3GPP message client in non-3GPP UE (100Bc) and provides the mapping to MSGin5G service ID.

At 601, the source UE (100A) sends the MSGin5G message request to the MSGin5G server (200). The MSGin5G message request includes an MSGin5G service identify (ID) of the source UE (100A), an MSGin5G service ID of the target UE (100B), and message ID information, a delivery status, an application ID, a payload, and priority type information elements. At 602, the MSGin5G server (200) determines the recipient is the non-3GPP UE (100Bc) and the MSGin5G Client is authorized to send the MSGin5G message to the non-3GPP UE (100Bc).

At 603, the MSGin5G server (200) forwards the MSGin5G message request to the non-3GPP message gateway (300B) as specified in 3GPP TS 23.554. At 604, the non-3GPP message gateway (300B) translates the MSGin5G message to the non-3GPP message with the delivery report requested and sends the non-3GPP message to the non-3GPP Message client (the target UE (100B)). At 605, If a delivery status report is required, the non-3GPP message gateway (300B) sends the MSGin5G message delivery report to the MSGin5G server (200), the MSGin5G server (200) forwards the MSGin5G message delivery report to the MSGin5G client (source UE (100A)).

In one embodiment, massive Internet of Things (MIoT) is one of key segment(s) of the 5G system. message service including legacy 3GPP and non-3GPP UEs widens the scope of the MSgin5G Service through the applicability of the provided method.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a 5th generation message (MSGin5G) server in a wireless network, the method comprising:
   receiving an MSGin5G message request from a source user equipment (UE) to deliver a message to a target UE in the wireless network,
   checking a registration repository of the MSGin5G server for an identifier (ID) of the target UE, wherein registration of a non-MSGin5G UE with the MSGin5G server is performed by a message gateway on behalf of the non-MSGin5G UE; and
   transmitting the message to the message gateway in case that the target UE is a non-MSGin5G UE and the target UE is registered with the message gateway.

2. The method as claimed in claim 1, further comprising:
   transmitting, the message to the target UE in case that the target UE is an MSGin5G UE.

3. The method as claimed in claim 1, wherein the message is transmitted to the target UE from the message gateway using a non-MSGin5G message transport service mechanism available in the target UE.

4. The method as claimed in claim 1, wherein an address conversion of the message and a protocol conversion of the message are performed by the message gateway.

5. The method as claimed in claim 1, wherein the MSGin5G message request comprises at least one of an ID of a source UE, the ID of the target UE, message ID information, a delivery status, an application ID, a payload, or priority type information elements.

6. The method as claimed in claim 1, wherein the message gateway comprises at least one of a legacy 3GPP message gateway or a non-3GPP message gateway.

7. The method as claimed in claim 1, further comprising:
   determining the target UE as a non-MSGin5G UE in case that the ID of the target UE is not registered in the registration repository.

8. A MSGin5G server in a wireless network, the MSGin5G server comprising:
   a memory;
   a processor; and
   a MSGin5G controller, operably connected to the memory and the processor, configured to:
     receive an MSGin5G message request from a source user equipment (UE) to deliver a message to a target UE in the wireless network,
     check a registration repository of the MSGin5G server for an identifier (ID) of the target UE, wherein registration of a non-MSGin5G UE with the MSGin5G server is performed by a message gateway on behalf of the non-MSGin5G UE, and
     transmit the message to the message gateway in case that the target UE is a non-MSGin5G the target UE is registered with the message gateway.

9. The MSGin5G server as claimed in claim 8,
   wherein the MSGin5G controller is further configured to:
   transmit, the message to the target UE in case that the target UE is an MSGin5G UE.

10. The MSGin5G server as claimed in claim 8,
    wherein the message is transmitted to the target UE from the message gateway using a non-MSGin5G message transport service mechanism available in the target UE.

11. The MSGin5G server as claimed in claim 8,
    wherein an address conversion of the message and a protocol conversion of the message are performed by the message gateway.

12. The MSGin5G server as claimed in claim 8, wherein the MSGin5G message request comprises at least one of an ID of a source UE, the ID of the target UE, message ID information, a delivery status, an application ID, a payload, or priority type information elements.

13. The MSGin5G server as claimed in claim 8, wherein the message gateway comprises at least one of a legacy 3GPP message gateway or a non-3GPP message gateway.

14. The MSGin5G server as claimed in claim 8,
    wherein the MSGin5G controller is further configured to:
      determine the target UE as a non-MSGin5G UE in case that the ID of the target UE is not registered in the registration repository.

* * * * *